United States Patent
Lee et al.

(10) Patent No.: US 12,260,104 B2
(45) Date of Patent: Mar. 25, 2025

(54) DATA STORAGE SYSTEM INCLUDING A DATA RELOCATION CIRCUIT AND A PLURALITY OF DATA STORAGE DEVICES AND OPERATION METHOD THEREOF

(71) Applicants: SK Hynix Inc., Icheon-si (KR); Inha University Research and Business Foundation, Incheon (KR)

(72) Inventors: Dayoung Lee, Incheon (KR); Minseok Song, Seoul (KR)

(73) Assignees: SK Hynix Inc., Icheon-si (KR); Inha University Research and Business Foundation, Incheon (KR)

( * ) Notice: Subject to any disclaimer, the term of this patent is extended or adjusted under 35 U.S.C. 154(b) by 41 days.

(21) Appl. No.: 18/337,377

(22) Filed: Jun. 19, 2023

(65) Prior Publication Data

US 2024/0241661 A1   Jul. 18, 2024

(30) Foreign Application Priority Data

Jan. 17, 2023   (KR) ........................ 10-2023-0006692

(51) Int. Cl.
*G06F 3/06*   (2006.01)
(52) U.S. Cl.
CPC .......... *G06F 3/0647* (2013.01); *G06F 3/0604* (2013.01); *G06F 3/0644* (2013.01); *G06F 3/0689* (2013.01)
(58) Field of Classification Search
CPC ...... G06F 3/0604; G06F 3/061; G06F 3/0616; G06F 3/0644; G06F 3/0647;
(Continued)

(56) References Cited

U.S. PATENT DOCUMENTS 9,405,478 B2   8/2016   Koseki et al.
10,353,596 B2   7/2019   Zhou
(Continued)

FOREIGN PATENT DOCUMENTS

KR   101872534 B1   6/2018

OTHER PUBLICATIONS

A. R. Rahiman et al. "Continuous media (CM) data stream in flash-based solid state disk (SSD) storage server," in Proc. 2nd Int. Conf. Commun. Eng. Technol. (ICCET), Apr. 12-15, 2019, pp. 11-16.
(Continued)

*Primary Examiner* — Larry T Mackall

(57) ABSTRACT

A data storage system includes an interface circuit configured to receive a read request for a chunk of data; a disk array including a plurality of main disks and a plurality of sub disks; an input/output control circuit configured to read a chunk from the main disks according to the read request; a data mapping circuit configured to store mapping relations between logical addresses and physical addresses of chunks; and a data relocation control circuit configured to control relocation of chunks stored in the disk array. The data relocation control circuit is configured to control movement of a first chunk stored in a main disk in an overloaded state to a main disk in an underloaded state, and to control movement of a second chunk stored in a sub disk to a main disk which can accommodate a required bandwidth of the second chunk.

18 Claims, 7 Drawing Sheets

(58) Field of Classification Search
CPC .. G06F 3/0683; G06F 3/0689; G06F 13/1668; G06F 2212/1016; G06F 2212/1036
See application file for complete search history.

(56) References Cited

U.S. PATENT DOCUMENTS

| | | |
|---|---|---|
| 2012/0047317 A1 | 2/2012 | Yoon et al. |
| 2013/0086302 A1 | 4/2013 | Tressler et al. |
| 2017/0060472 A1* | 3/2017 | Zhuang ................ G06F 3/0649 |
| 2020/0097188 A1* | 3/2020 | Gunda ................ G06F 12/1009 |
| 2021/0089226 A1 | 3/2021 | Swaminathan et al. |

OTHER PUBLICATIONS

D. He et al. "CUBIST: High-quality 360-degree video streaming services via tile-based edge caching and FoV-adaptive prefetching," in Proc. IEEE Int. Conf. Web Services (ICWS), Sep. 5-10, 2021, pp. 208-218.

M. Song "Minimizing power consumption in video servers by the combined use of solid-state disks and multi-speed disks," IEEE Access, Jun. 5, 2018, pp. 25737-25746, vol. 6.

Y. Gao et al. "A load-aware data migration scheme for distributed surveillance video processing with hybrid storage architecture," in Proc. IEEE 19th Int. Conf. High Perform. Comput. Commun.; IEEE 15th Int. Conf. Smart City; IEEE 3rd Int. Conf. Data Sci. Syst. (HPCC/SmartCity/DSS), Dec. 18-20, 2017, pp. 563-570.

Z. Sun et al. "DPPDL: A dynamic partial-parallel data layout for green video surveillance storage," IEEE Trans. Circuits Syst. Video Technol., Jan. 2018, pp. 193-205, vol. 28, No. 1.

Y. Kang et al. "A reliability enhanced video storage architecture in hybrid SLC/MLC NAND flash memory," J. Syst. Archit., May 15, 2018, pp. 33-42, vol. 88.

O. A. Al-Wesabi et al. "Data stream management system for video on demand hybrid storage server," Int. J. Intell. Syst. Technol. Appl., Jul. 2019, pp. 470-493, vol. 18, No. 5.

J. Liu et al. "Endurable SSD-based read cache for improving the performance of selective restore from deduplication systems," J. Comput. Sci. Technol., Jan. 2018, pp. 58-78, vol. 33., No. 1.

Y. Chai et al. "WEC: Improving durability of SSD cache drives by caching write-efficient data," IEEE Trans. Comput., Nov. 2015, pp. 3304-3316, vol. 64, No. 11.

C. Ma et al. "Rebirth-FTL: Lifetime optimization via approximate storage for NAND flash memory," IEEE Trans. Comput.-Aided Design Integr. Circuits Syst., Oct. 2022, pp. 3276-3289, vol. 41, No. 10.

J. Yen et al. "Efficient bad block management with cluster similarity," in Proc. IEEE Int. Symp. High-Perform. Comput. Archit. (HPCA), Apr. 2-6, 2022, pp. 503-513.

Y. Kim et al. "HybridStore: A cost-efficient, high-performance storage system combining SSDs and HDDs," in Proc. IEEE 19th Annu. Int. Symp. Modeling, Anal., Simulation Comput. Telecommun. Syst., Jul. 25-27, 2011, pp. 227-236.

S. Lee et al. "Lifetime management of flash-based SSDs using recovery-aware dynamic throttling," in Proc. 10th USENIX Conf. File Storage Technol., Feb. 14-17, 2012, pp. 1-14.

R. Salkhordeh et al. "ReCA: An efficient reconfigurable cache architecture for storage systems with online workload characterization," IEEE Trans. Parallel Distrib. Syst., Jul. 2018, pp. 1605-1620, vol. 29, No. 7.

"Hours of Video Uploaded to YouTube Every Minute as of Feb. 2020", Jul. 2022. [Online]. Available: https://www.statista.com/statistics/259477/hours-of-video-uploaded-to-youtube-every-minute/.

D.K. Krishnappa et al. "Optimizing the video transcoding workflow in content delivery networks," in Proc. 6th ACM Multimedia Syst. Conf., Mar. 18, 2015, pp. 37-48.

D.J. Vergados et al. "FDASH: A fuzzy-based MPEG/DASH adaptation algorithm," IEEE Syst. J., Jun. 2016, pp. 859-868, vol. 10, No. 2.

R. Aparicio-Pardo et al. "Transcoding live adaptive video streams at a massive scale in the cloud," in Proc. 6th ACM Multimedia Syst. Conf., Mar. 18, 2015, pp. 1-12.

H. Zhao et al. "Popularity-based and version-aware caching scheme at edge servers for multi-version VoD systems," IEEE Trans. Circuits Syst. Video Technol., Mar. 2021, pp. 1234-1248, vol. 31, No. 3.

C. Zhou et al. "A control-theoretic approach to rate adaption for DASH over multiple content distribution servers," IEEE Trans. Circuits Syst. Video Technol., Apr. 2014, pp. 681-694, vol. 24, No. 4.

J. Niu et al. "Hybrid storage systems: A survey of architectures and algorithms," IEEE Access, 2018, pp. 13385-13406, vol. 6.

A. Dan et al. "An online video placement policy based on bandwidth to space ratio (BSR)," In Proc. ACM SIGMOD Int. Conf. Manag. Data, May 22, 1995, pp. 376-385.

W. Li et al. "CacheDedup: In-line deduplication for flash caching", in Proc. 14th USENIX Conf. File Storage Technol., Feb. 22-25, 2016, pp. 301-314, Santa Clara, CA.

N. Zhao et al., "Chameleon: An adaptive wear balancer for flash clusters," in Proc. IEEE Int. Parallel Distrib. Process. Symp. (IPDPS), May 21-25, 2018, pp. 1163-1172.

W. Wang et al. "SWANS: An interdisk wear-leveling strategy for RAID-0 structured SSD arrays," ACM Trans. Storage, Apr. 29, 2016, pp. 1-21, vol. 12, No. 3.

Q. Li et al. "A survey of SSD lifecycle prediction," in Proc. IEEE 10th Int. Conf. Softw. Eng. Service Sci. (ICSESS), Oct. 18-20, 2019, pp. 195-198.

C. Mellor "WD and Tosh Talk up Penta-Level Cell Flashes", Aug. 7, 2019; Accessed: Jul. 2022, [Online]. Available: https://blocksandfiles.com/2019/08/07/penta-levelcell-flash/.

S. Maneas et al. "Operational characteristics of SSDs in enterprise storage systems: A large-scale field study," in Proc. 20th USENIX Conf. File Storage Technol., Feb. 22-24, 2022, pp. 165-180, Santa Clara, CA.

S. Hwang et al., "Energy-efficient symmetric BC-BCH decoder architecture for mobile storages," IEEE Trans. Circuits Syst.-I, Nov. 2019, pp. 4462-4475 vol. 66, No. 11.

C. Xiao et al. "Wear-aware memory management scheme for balancing lifetime and performance of multiple NVM slots," in Proc. 35th Symp. Mass Storage Syst. Technol. (MSST), May 20-24, 2019, pp. 148-160.

Y. Takai et al. "Analysis on heterogeneous SSD configuration with quadruple-level cell (Qlc) NAND flash memory," in Proc. IEEE 11th Int. Memory Workshop (IMW), May 12-15, 2019, pp. 1-6.

Micron Technical Brief, "Micron Quad-Level Cell Technology Brings Affordable Solid State Storage to More Applications", Accessed: Jul. 2022. [Online]. Available: https://www.micron.com/-/media/client/global/documents/products/technical-marketing-brief/qlc_technology_high-level_tech_brief.pdf.

S. Ahmadian et al. "ETICA: Efficient two-level I/O caching architecture for virtualized platforms," IEEE Trans. Parallel Distrib. Syst., Oct. 1, 2021, pp. 2415-2433, vol. 32, No. 10.

M. Lin et al. "Buffer-aware data migration scheme for hybrid storage systems," IEEE Access, Aug. 22, 2018, pp. 47646-47656, vol. 6.

M. Ryu et al. "FlashStream: A multi-tiered storage architecture for adaptive HTTP streaming," in Proc. 21st ACM Int. Conf. Multimedia, Oct. 21, 2013, pp. 1-10.

M. Ryu et al. "Impact of flash memory on video-on-demand storage: Analysis of tradeoffs", in Proc. 2nd Annu. ACM Conf. Multimedia Syst., Feb. 23, 2011, pp. 1-12, Santa Clara, CA.

D. Arteaga et al. "CloudCache: On-demand flash cache management for cloud computing," in Proc. 14th USENIX Conf. File Storage Technol., Feb. 22-25, 2016, pp. 355-369, Santa Clara, CA.

N. Papandreou et al. "Open block characterization and read voltage calibration of 3D QLC NAND flash," in Proc. IEEE Int. Rel. Phys. Symp. (IRPS), Apr. 28, 2020-May 30, 2020, pp. 1-6.

J. Huang et al. "FlashBlox: Achieving both performance isolation and uniform lifetime for virtualized SSDs," in Proc. 15th USENIX Conf. File Storage Technol., Feb. 27-Mar. 2, 2017, pp. 375-390, Santa Clara, CA.

(56) References Cited

OTHER PUBLICATIONS

A. O. Al-Abbasi et al. "Video streaming in distributed erasure-coded storage systems: Stall duration analysis," IEEE/ACM Trans. Netw., Aug. 1, 2018, pp. 1921-1932, vol. 26, No. 4.

Saatialsoruji "A novel snake-like data placement policy for improving video processing in Hadoop clusters," in Proc. IEEE Conf. Big Data Anal. (ICBDA), Nov. 17-19, 2020, pp. 12-19.

X. Dai et al. "Optimal scheduling of data-intensive applications in cloud-based video distribution services," IEEE Trans. Circuits Syst. Video Technol., Jan. 2017, pp. 73-83, vol. 27, No. 1.

X. Zhang et al. "Realizing low-cost flash memory based video caching in content delivery systems," IEEE Trans. Circuits Syst. Video Technol., Apr. 2018, pp. 984-996, vol. 28, No. 4.

Y. Guo et al. "Dynamic cache reconfiguration strategies for cluster-based streaming proxy," Comput. Commun., Jun. 2006, pp. 1710-1721, vol. 29, No. 10.

Y. Zhou et al. "Video popularity dynamics and its implication for replication," IEEE Trans. Multimedia, Aug. 2015, pp. 1273-1285, vol. 17, No. 8.

Y. Akçay et al. "Greedy algorithm for the general multidimensional knapsack problem," Ann. Oper. Res., Dec. 21, 2006, pp. 17-29, vol. 150, No. 1.

K. Qu et al. "A dynamic replica strategy based on Markov model for Hadoop distributed file system (HDFS)," in Proc. 4th Int. Conf. Cloud Comput. Intell. Syst. (CCIS), Aug. 17-19, 2016, pp. 337-342.

C. Liu et al. "A distributed video share system based on Hadoop," in Proc. IEEE 3rd Int. Conf. Cloud Comput. Intell. Syst. (CCIS), Nov. 27-29, 2014, pp. 587-590.

H. Wang et al. "CHCF: A cloud-based heterogeneous computing framework for large-scale image retrieval," IEEE Trans. Circuits Syst. Video Technol., Dec. 2015, pp. 1900-1913, vol. 25, No. 12.

"HDFS Configuration", Jul. 2022. [Online]. Available: https://hadoop.apache.org/docs/current/hadoop-project-dist/hadoop-hdfs/hdfs-default.XML.

"HDFS Users Guide", Jul. 2022. [Online]. Available: https://hadoop.apache.org/docs/stable/hadoop-project-dist/hadoop-hdfs/HdfsUserGuide.html.

"HDFS Disk Balancer", Jul. 2022. [Online]. Available: https://hadoop.apache.org/docs/stable/hadoop-project-dist/hadoop-hdfs/HDFSDiskbalancer.html.

"Archival Storage, SSD & Memory", Jul. 2022. [Online]. Available: https://hadoop.apache.org/docs/stable/hadoop-project-dist/hadoop-hdfs/ArchivalStorage.html.

"Smartmontools Official Site", Oct. 2022. [Online]. Available: https://www.smartmontools.org/.

A. Dan et al. "Dynamic batching policies for an on-demand video server," Multimedia Syst., Jun. 1, 1996, pp. 112-121, vol. 4, No. 3.

S. Lim et al. "Inter-chunk popularity-based edge-first caching in content-centric networking," IEEE Commun. Lett., Aug. 2014, pp. 1331-1334, vol. 18, No. 8.

H. Yu et al., "Understanding user behavior in large-scale video-on-demand systems," in Proc. EuroSys Conf. (EuroSys), Apr. 18, 2006, pp. 1-12.

"HDFS Architecture", Jul. 2022. [Online]. Available: https://hadoop.apache.org/docs/stable/hadoop-project-dist/hadoop-hdfs/HdfsDesign.html.

"BlockPlacementPolicies", Oct. 2022. [Online]. Available: https://hadoop.apache.org/docs/stable/hadoop-project-dist/hadoop-hdfs/HdfsBlockPlacementPolicies.html.

J. Lee et al. "Lifetime-aware solid-state disk (SSD) cache management for video servers," Multimedia Syst., May 27, 2019, pp. 695-708, vol. 25.

S. Lee et al. "Effective lifetime-aware dynamic throttling for NAND flash-based SSDs," IEEE Trans. Comput., Apr. 2016, pp. 1075-1089, vol. 65, No. 4.

G. Xie et al. "Access types effect on internet video services and its implications on CDN caching," IEEE Trans. Circuits Syst. Video Technol., May 2018, pp. 1183-1196, vol. 28, No. 5.

J. He et al. "Toward optimal deployment of cloud-assisted video distribution services," IEEE Trans. Circuits Syst. Video Technol., Oct. 2013, pp. 1717-1728, vol. 23, No. 10.

\* cited by examiner

DATA STORAGE SYSTEM INCLUDING A DATA RELOCATION CIRCUIT AND A PLURALITY OF DATA STORAGE DEVICES AND OPERATION METHOD THEREOF

CROSS-REFERENCE TO RELATED APPLICATION

The present application claims priority under 35 U.S.C. § 119(a) to Korean Patent Application No. 10-2023-0006692, filed on Jan. 17, 2023, which is incorporated herein by reference in its entirety.

BACKGROUND

1. Technical Field

Various embodiments generally relate to a data storage system including a plurality of data storage devices and an operation method of the data storage system.

2. Related Art

Dynamic Adaptive Streaming over HTTP (DASH) technology is a de facto standard technology used by video streaming service providers such as YouTube and Netflix.

DASH technology requires multiple versions of video files with different bit rates. For example, on YouTube, a single video has at least 20 different bit rate versions.

Due to the characteristics of the DASH technology, a large-capacity data storage system capable of storing data for all the versions is required.

Due to the development of technology, the use of solid state drives (SSDs) instead of hard disk drives (HDDs) is gradually increasing.

Depending on the popularity of video, that is, the frequency of requests for data, bandwidth may be concentrated in a specific SSD, so it is necessary to change the location of data for bandwidth distribution.

However, SSDs have a lifespan limitation regarding a program/erasure (P/E) cycle, and due to this, there is a problem that the drive writes per day (DWPD) rating of an SSD by its manufacturer is fixed.

In the conventional data storage system, optimization is performed only for bandwidth without considering the lifespan of the disk, resulting in imbalanced wear of the disk, or optimization is performed only for the lifespan of the disk without considering bandwidth, resulting in poor performance caused by increase of data movement and reduction of the lifetime of the disk.

SUMMARY

In accordance with an embodiment of the present disclosure, a data storage system may include an interface circuit configured to receive a read request for a chunk; a disk array including a plurality of main disks and a plurality of sub disks; an input/output (I/O) control circuit configured to read the chunk among the plurality of main disks according to the read request; a data mapping circuit configured to store mapping relations between logical addresses and physical addresses of chunks; and a data relocation control circuit configured to control relocation of chunks stored in the disk array, wherein the data storage system is configured to select a source disk from among one or more main disks that are in an overloaded state, and wherein the data relocation control circuit is configured to select a first target disk from among one or more main disks that are in an underloaded state; perform a first operation for relocating a first chunk from the source disk to the first target disk; and perform a second operation for designating a second chunk stored in a sub disk to be moved to a second target disk among the plurality of main disks which can accommodate a required bandwidth of the second chunk, and wherein a main disk being in the overloaded state corresponds to a maximum bandwidth that can be provided by that main disk being less than sum of required bandwidths of a plurality of chunks stored in that main disk, and that main disk being in the underloaded state corresponds to the maximum bandwidth that can be provided by that main disk being greater than or equal to the sum of required bandwidths by the plurality of chunks stored in that main disk.

In accordance with an embodiment of the present disclosure, an operation method of a data storage system storing one or more chunks in a plurality of a main disks and a plurality of sub disks, the operation method comprising: selecting a source disk from among main disks in an overloaded state; selecting a first target disk from among main disks in an underloaded state; performing a first operation for setting a first chunk in the source disk to be moved to the first target disk; selecting a second chunk from chunks stored in a sub disk; selecting a second target disk which can accommodate a required bandwidth of the second chunk from among the plurality of main disks; and performing a second operation for setting the second chunk to be moved to the second target disk, wherein a main disk being in the overloaded state corresponds to a maximum bandwidth that can be provided by that main disk is less than a sum of required bandwidths of a plurality of chunks stored in that main disk, and that main disk being in the underloaded state corresponds to the maximum bandwidth that can be provided by that main disk being greater than or equal to the sum of the required bandwidths of the plurality of chunks stored in that main disk.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
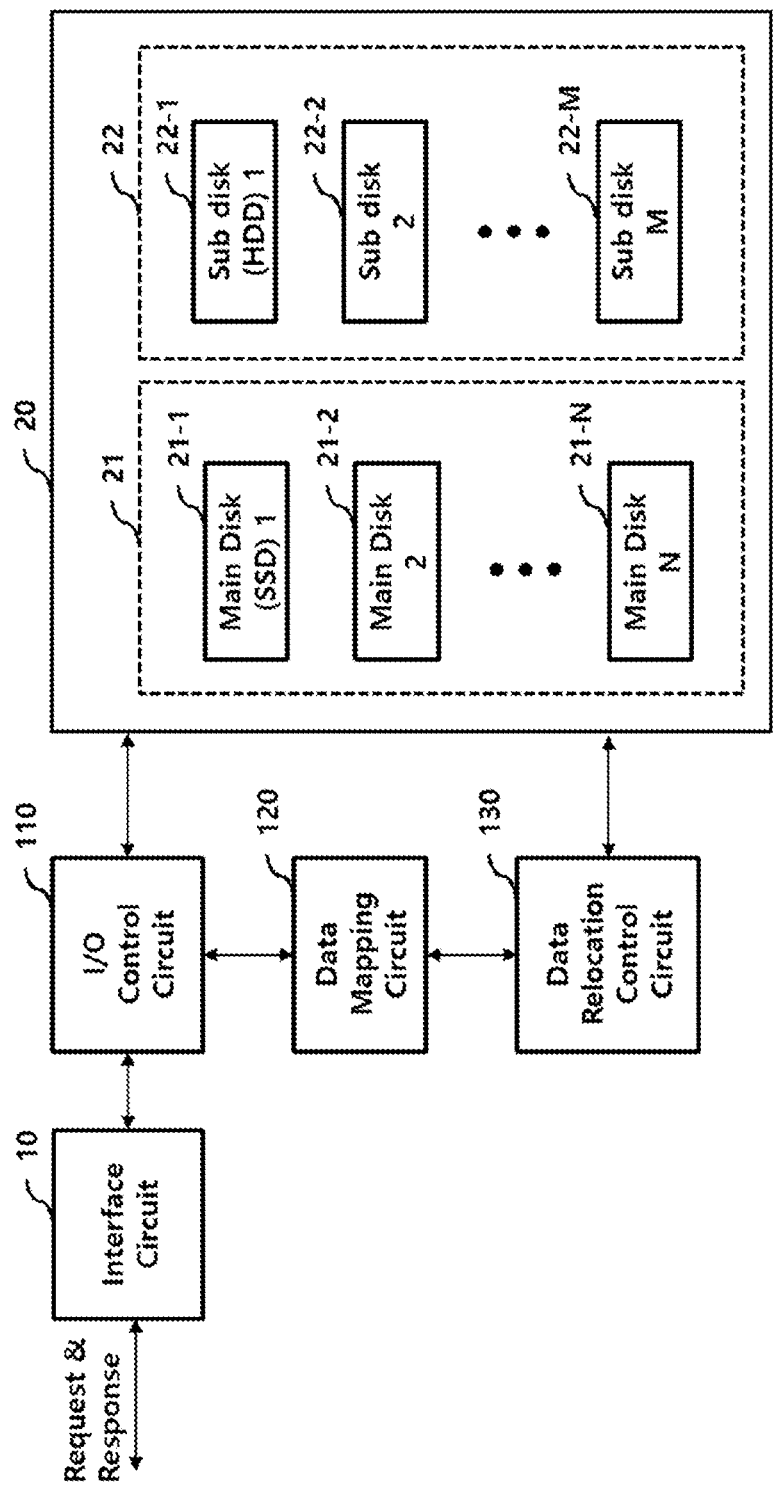
FIG. 1 illustrates a data storage system according to an embodiment of the present disclosure.

FIG. 1 is a block diagram showing a data storage system 100 according to an embodiment of the present disclosure.

Hereinafter, the data storage system 100 is disclosed in the illustrative context of a server providing a video streaming service and including a plurality of disks for storing video data, but embodiments are not limited thereto.

The data storage system 100 includes an interface circuit 10 that receives a data read or write request and transmits a response thereto, a disk array 20, an input/output (I/O) control circuit 110, a data mapping circuit 120, and data relocation control circuit 130.

Since the operation of the I/O control circuit 110, which reads data from the disk array 20 or writes data to the data array 20 according to a read or write request provided by the interface circuit 10, can be understood easily by those skilled in the art from a conventional data storage system, a detailed description thereof will be omitted.

In this embodiment, the disk array 20 includes a main disk array 21 and a sub disk array 22.

The main disk array 21 includes a plurality of main disks 21-1, 21-2, ..., 21-N, where N is a natural number, and the sub disk array 22 includes a plurality of sub disks 22-1, 22-2, ..., 22-M, where M is a natural number.

Hereinafter, each of the main disk array 21 and the sub disk array 22 may be referred to as a disk array, and each of a main disk and a sub disk may be referred to as a disk.

In this embodiment, the main disk array 21 provides data in response to a data read request, and the sub disk array 22 stores data not currently being requested. In embodiments, the read latency performance, read bandwidth performance, or both of the sub disks is substantially lower than that of the main disks.

When a read request is generated for a video file stored in the sub disk array 22, the corresponding video file is transmitted to the main disk array 21 and data is provided from the main disk array 21.

In the embodiment described herein, each of the plurality of main disks 21-1, 21-2, ..., 21-N is an SSD, and each of the plurality of sub disks 22-1, 22-2, ..., 22-M is an HDD, but types of the disks are not limited thereto. Hereinafter, a main disk may be referred to as an SSD and a sub disk may be referred to as an HDD.

In this embodiment, types or characteristics of the main disks may differ from each other. For example, some main disks may be a triple level cell (TLC) type and some main disks may be a quadruple level cell (QLC) type.

The data mapping circuit 120 stores and manages a relationship between a logical address and a physical address of requested data.

In this embodiment, one file includes a plurality of chunks of a fixed size, and data location operation and data relocation operation are managed in units of chunks.

Accordingly, in this embodiment, it is assumed that a data request provided to the interface circuit 10 from the outside is a request for a chunk.

Chunks included in a file may be located on different disks.

In this embodiment, the popularity of video data is managed in units of chunks rather than units of files. For example, the number of read requests for a chunk can be represented as popularity.

In general, since the relationship between a file and chunks is generally managed in the file system of an operating system, it is sufficient for the data mapping circuit 120 to store and manage the mapping relationship between a logical address and a physical address of each chunk.

At this time, the physical address may include both information identifying a disk and a physical address in a disk.

The data relocation control circuit 130 relocates data among a plurality of disks included in the disk array 20.

In the case of this embodiment, data are relocated in units of chunks. Accordingly, data relocation may be referred to as chunk relocation. However, the unit of data to be relocated may vary depending on the embodiment.

In this technology, when data is relocated, the goal is to maximize a sum of bandwidths of multiple disks and at the same time to reduce an amount of write operations so as to decrease reductions of the lifespans of multiple disks.

When the chunks are relocated, the data mapping relationship is modified through the data mapping circuit 120.

The data relocation control circuit 130 manages various variables required for data relocation.

For example, each main disk may be managed as an overloaded disk or an underloaded disk, and during a data relocation operation, chunks to be relocated and information on the disk to move the chunks to may be temporarily stored. Additionally, further variables may be used.

A data relocation operation of the data relocation control circuit 130 will be described in detail below.

Figure 2:
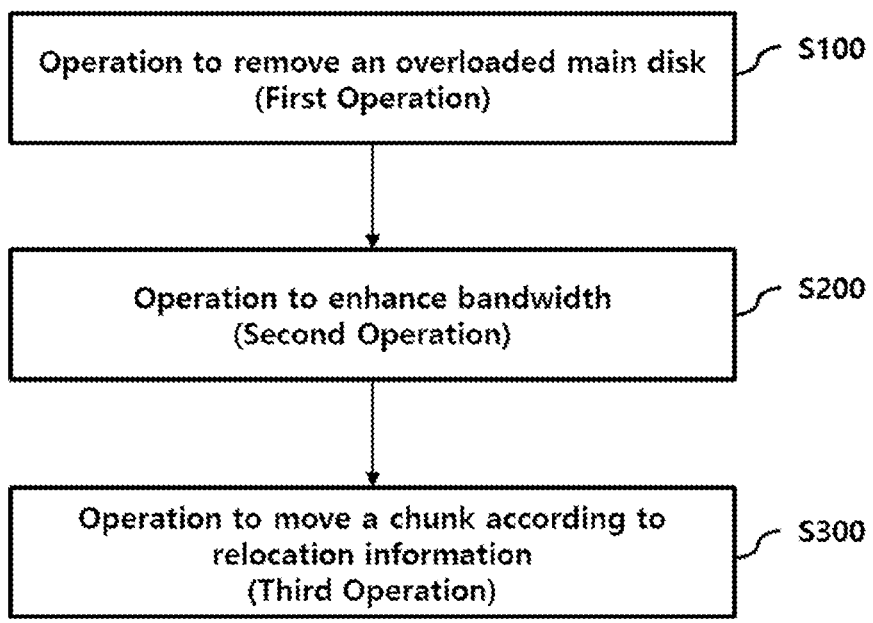
FIG. 2 is a flowchart showing an operation of a data storage system according to an embodiment of the present disclosure.

FIG. 2 is a flowchart illustrating a data relocation operation of the data storage system 100 according to an embodiment of the present disclosure.

The data storage system 100 may store data in any method.

That is, in the present technology, there is no limitation on the method of storing externally provided data on the disk regardless of the data relocation operation.

The data storage system 100 according to this embodiment performs a data relocation operation.

The purpose of the present technology is to relocate data in a way that does not degrade the lifespan of each SSD while efficiently using bandwidth. More specific details will be disclosed below.

The data relocation operation according to the present technology includes an operation to remove an overloaded main disk S100 from an overloaded state, an operation to enhance bandwidth S200, and an operation to move a chunk S300.

Hereinafter, the operation to remove an overloaded main disk from an overloaded state may be referred to as a first operation, the operation to enhance bandwidth may be referred to as a second operation, and the operation to move a chunk may be referred to as a third operation.

In the first and second operations in this embodiment, relocation information including an index of a chunk to be relocated and an index of a disk to which the chunk to be moved is determined.

Then, in the third operation, chunks are physically relocated according to the relocation information. This can reduce overhead that occurs in the process of relocating chunks.

In another embodiment, chunks may be physically relocated while performing the first operation and the second operation.

Figure 3:
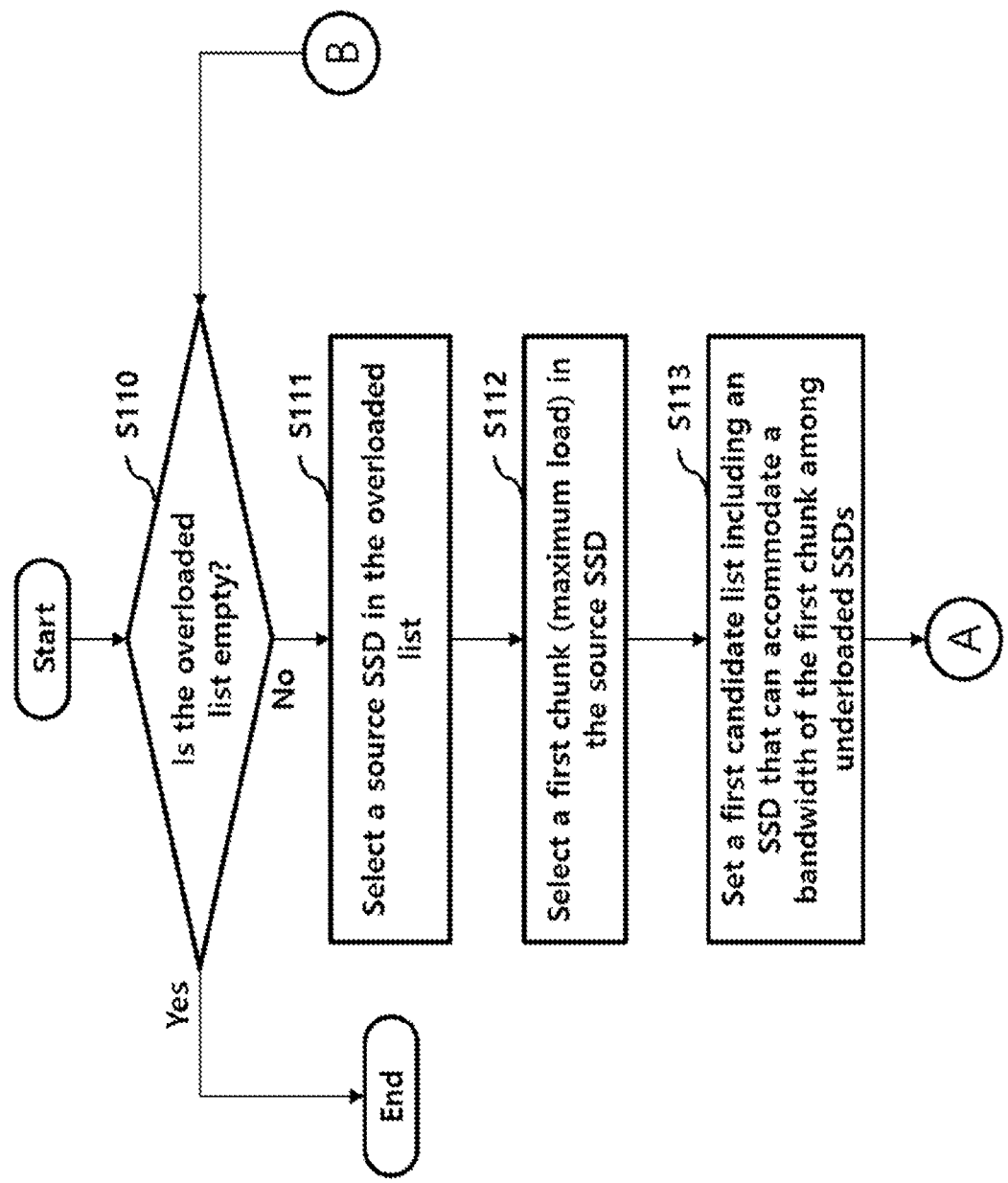
FIGS. 3 and 4 are flowcharts showing a first operation according to an embodiment of the present disclosure.
Figure 4:
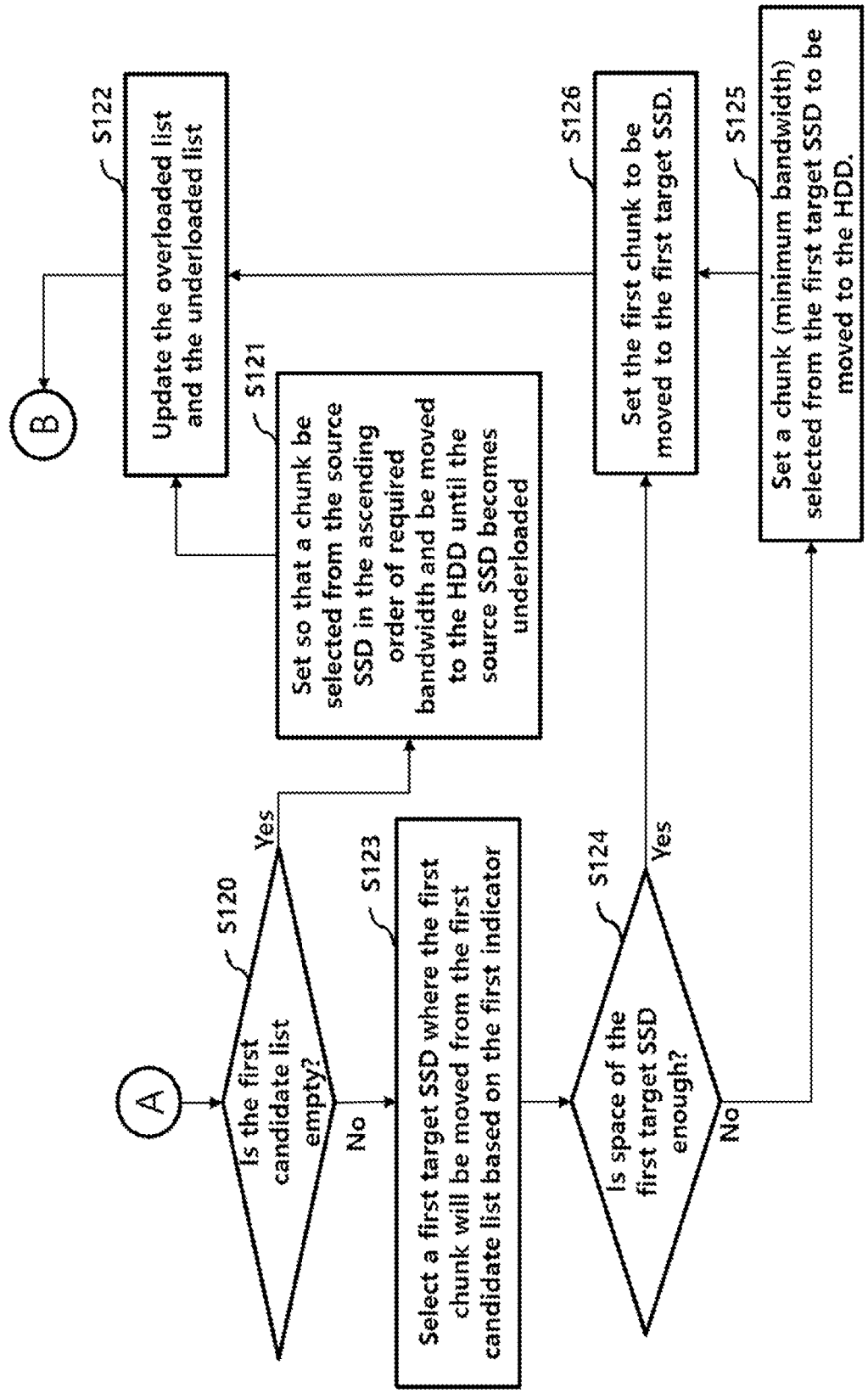

FIGS. 3 and 4 are flowcharts illustrating the first operation.

The first operation is performed until there is no overloaded SSD.

First, it is determined whether an overloaded list is empty at S110.

As described above, the data relocation control circuit 130 manages the overloaded list including indexes of SSDs in overloaded states and an underloaded list including indexes of SSDs in underloaded states.

The residual bandwidth of an SSD corresponds to a value obtained by subtracting a sum of required bandwidths for chunks stored in the SSD from the maximum bandwidth that the SSD can provide.

If the value of the residual bandwidth of an SSD is negative, it is classified as an overloaded SSD, and otherwise, it is classified as an underloaded SSD.

The required bandwidth of each chunk may vary depending on the resolution of chunk data and frequency of read requests for the chunk, that is, popularity.

For example, the required bandwidth of a chunk is larger if the chunk is part of a high-resolution video file, and smaller if it is part of a lower-resolution video file.

Also, the required bandwidth of a chunk may be higher when the frequency of read requests for that chunk is high, and accordingly may vary depending on fluctuations in popularity.

The data relocation control circuit 130 manages information about the required bandwidth of each chunk as a variable.

If the overloaded list is empty, the process illustrated in FIGS. 3 and 4 is terminated, otherwise, a source SSD is selected from the overloaded list at S111.

In this embodiment, the source SSD corresponds to an SSD with a lowest residual bandwidth among the SSDs, that is, an SSD that is most overloaded.

Next, a first chunk to be moved is selected from the source SSD at S112. In this embodiment, the first chunk corresponds to a chunk having the highest required bandwidth in the source SSD.

Thereafter, a first candidate list including indexes of SSDs capable of accommodating the bandwidth of the first chunk among the underloaded SSDs is produced at S113.

Subsequently, as shown in FIG. 4, it is determined whether the first candidate list is empty at S120.

If the first candidate list is empty, it means that there is no SSD having a bandwidth sufficient to accommodate the bandwidth of the first chunk.

In this case, chunks are sequentially selected from the source SSD in ascending order of required bandwidth until removal of the selected chunks would place the source SSD in the underloaded state, and the corresponding chunks are set to be moved to the HDD at S121. This chunk relocation information is added to the aforementioned relocation information.

Thereafter, information in the overloaded list and the underloaded list is updated at S122, and the process returns to step S110 of FIG. 3.

At this time, it is assumed that updating the information of the overloaded list and the underloaded list is based on a state after the chunks are physically relocated according to the relocation information.

If the first candidate list is not empty, a first target SSD to which the first chunk is to be moved is selected from the first candidate list based on the first indicator at S123.

The first indicator used in this embodiment is as shown in Equation 1.

$$R_{i,j}^{FMA} = \frac{B_i - F_j^{ST} B_{L_j}}{ADWD_j + \frac{S^{chunk}}{W_j^{DWPD}}}$$ [Equation 1]

The first indicator, $R_{i,j}^{FMA}$ in Equation 1, corresponds to a value when an i-th chunk is moved to a j-th SSD.

The manufacturer provides a Drive Writes Per Day (DWPD) value for each SSD. DWPD means the number of times that the entire capacity of an SSD can be overwritten each day (on average) during the manufacturer's warranty period without invalidating the warranty.

For example, if the value of DPWD of a 1 TB SSD is 3, it means that 1 TB of data can be written three times a day without invalidating the warranty.

In the following disclosure, for the j-th SSD the bandwidth is denoted by $B_j^{limit}$, the storage space by $S_j^{limit}$, and the DWPD by $N_j^{DWPD}$.

Accordingly, data that can be written to the j-th SSD per day can be expressed as $N_j^{DPWD} S_j^{limit}$ bytes at most.

If the lifespan of the j-th SSD is $N_j^{life}$ days and the ratio of the actual usage period to the lifespan is $p_j$, data $W_j^{DWPD}$ that can actually be written during the entire usage period of the j-th SSD can be expressed as follows:

$$W_j^{DWPD} = N_j^{DWPD} S_j^{limit} p_j N_j^{life}$$

If data actually written during the entire usage period of the j-th SSD is expressed as $W_j^{actual}$, actual data writes per DWPD (ADWD) of the j-th SSD can be expressed as follows.

$$ADWD_j = W_j^{actual}/W_j^{DWPD}$$

If the value of ADWD is greater than 1, more data is written compared to the value of DWPD, which shortens the lifespan of the SSD. Accordingly, in order to increase the lifespan of the SSD, it is desirable to keep the value of ADWD as small as possible.

In Equation 1, the denominator of the first indicator represents the ADWD value after chunk relocation, and the numerator represents the permitted bandwidth increase amount of the underloaded SSD according to the chunk relocation.

In Equation 1, $L_j$ represents a chunk index of a chunk requiring the lowest bandwidth among chunks in the j-th SSD, and accordingly $B_{L_j}$ represents a bandwidth of the chunk indicated by $L_j$.

In addition, $F_j^{ST}$ is a residual space flag and indicates whether there is remaining space for the chunk. $F_j^{ST}=0$ indicates that there is residual space to store the chunk and the chunk can be moved to the j-th SSD, and $F_j^{ST}=1$ indicates the residual space enough to store the chunk does not exist.

In this embodiment, if there is no residual space enough to store the chunk, the chunk having the lowest required bandwidth among chunks in the first target SSD is set to be moved to the HDD. Accordingly, the denominator of Equation 1 represents the required bandwidth increase amount of the underloaded SSD.

When the value of the numerator is determined in Equation 1, it is desirable to increase the lifespan of the disk by selecting a value of j that minimizes the size of the denominator.

Accordingly, in step S123, it is preferable to select a first target SSD maximizing the first indicator.

Thereafter, it is determined whether there is enough space to store the chunk in the first target SSD at S124.

If the storage space is insufficient, a chunk to be moved from the first target SSD is selected and set to be moved to the HDD at S125. At this time, it is advantageous to prevent throughput degradation by selecting a chunk having the lowest required bandwidth among chunks in the first target SSD as a chunk to be moved to the HDD.

Thereafter, the first chunk is set to be moved to the first target SSD at S126. If it is determined that the storage space is sufficient in step S124, step S125 is skipped and step S126 is performed.

When the step S126 is finished, step S122 is performed to update the overloaded list and the underloaded list, and step S110 of FIG. 3 is performed.

Figure 5:
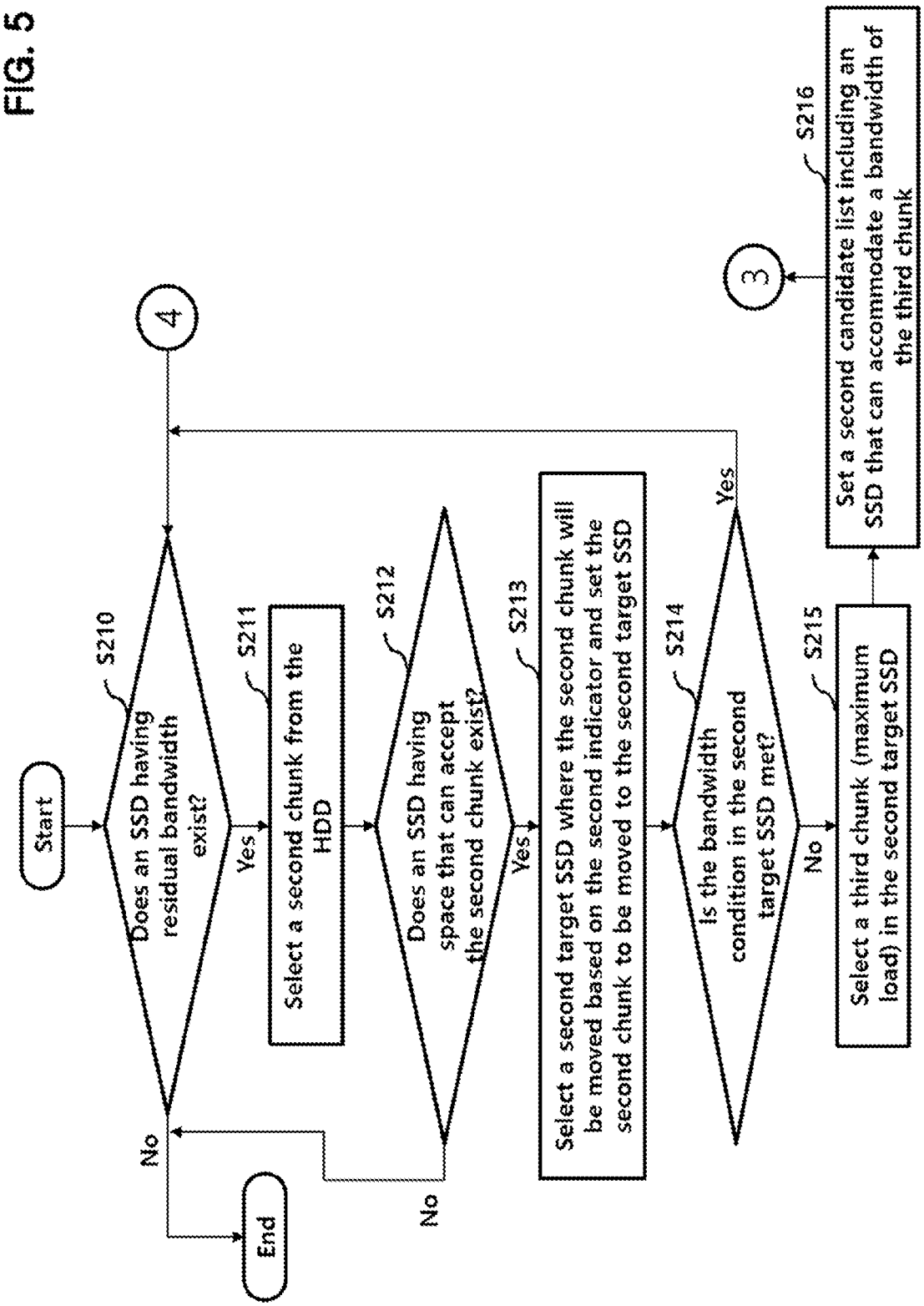
FIGS. 5 and 6 are flowcharts showing a second operation according to an embodiment of the present disclosure.
Figure 6:
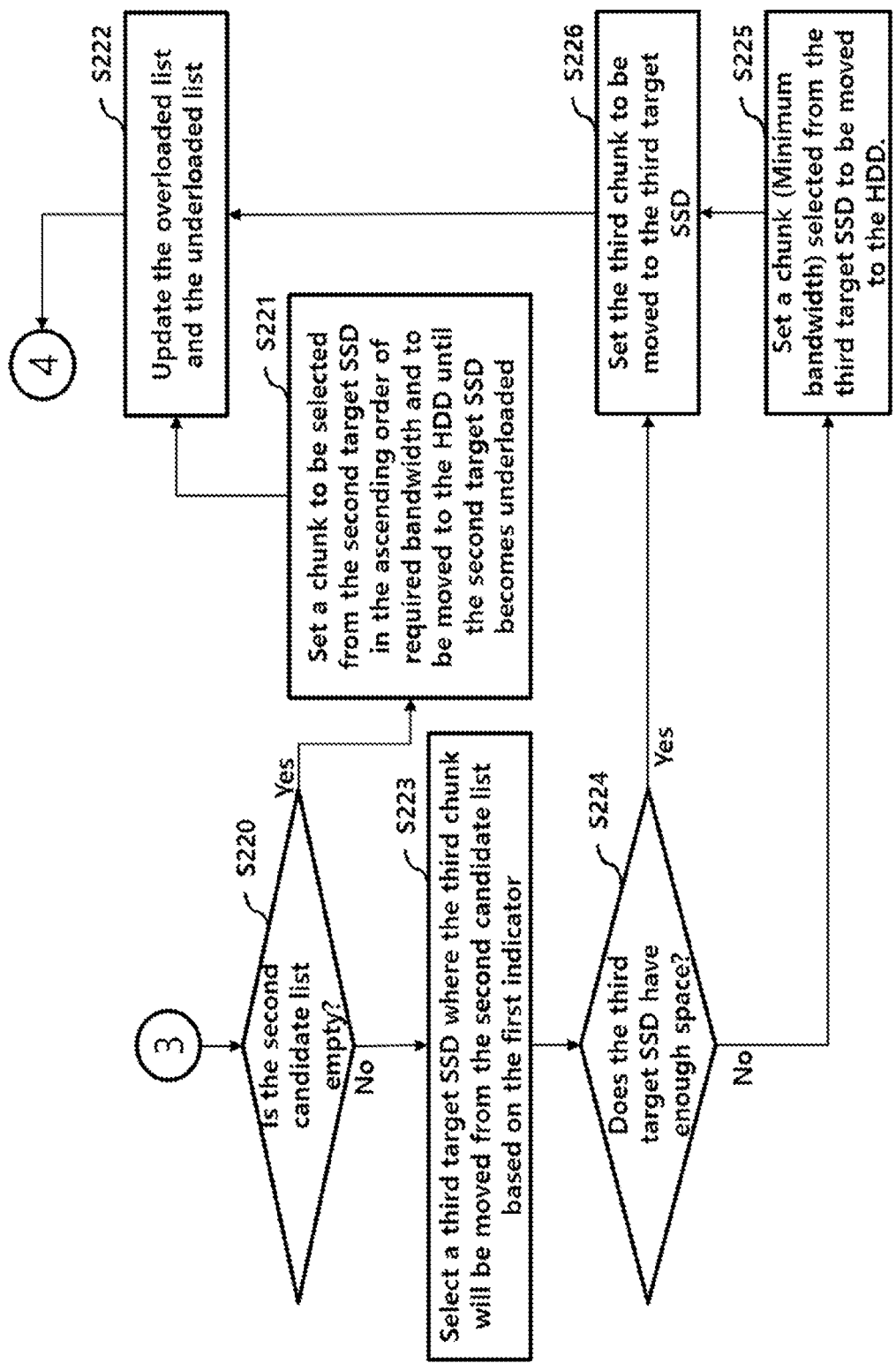

FIGS. 5 and 6 are flowcharts illustrating the second operation.

In the second operation, one or more chunks in an HDD may be moved to an SSD to improve throughput by maximally using the available bandwidth.

First, it is determined whether there is an SSD with residual bandwidth at S210.

If there is no SSD with residual bandwidth, the operation is terminated, and if there is an SSD with residual bandwidth, a second chunk is selected from the HDD at S211. In this embodiment, a chunk having the highest required bandwidth among chunks in the HDD is selected as the second chunk.

Then, it is determined whether there is an SSD having space to accommodate the second chunk at S212.

If there is no SSD capable of accommodating the second chunk, the operation is terminated.

If there is an SSD capable of accommodating the second chunk, a second target SSD to which the second chunk is to be moved is selected according to the second indicator at S213.

At this time, the second indicator is as shown in Equation 2 and may be referred to as a Bandwidth to Space Ratio (BSR) indicator. Since the BSR indicator is an indicator used in prior arts such as article ⌈A. Dan and D. Sitaram. "An online video placement policy based on bandwidth to space ratio (BSR)," In Proc. ACM SIGMOD Int. Conf. Manag. Data, May 1995, pp. 376-385.1⌋, a detailed description thereof will be omitted.

$$R_{i,j}^{BSR} = \frac{B_j^{limit} - \left(\sum_{\forall i\, X_i=j} B_i + B_i\right)}{S_j^{limit} - \left(\sum_{\forall i\, X_i=j} S^{chunk} + S^{chunk}\right)}$$

[Equation 2]

In Equation 2, $R_{i,j}^{BSR}$ represents the second indicator, i represents the index of the chunk to be moved, and j represents the index of the second target SSD. $X_i$ represents an index of an SSD where i-th chunk is stored.

That is, if the index j of the SSD maximizing the value of the second indicator for the given chunk index is found, it is displayed as the index $I^{des}$ of the second target SSD.

In Equation 2, when the second indicator is maximum, it means that the residual bandwidth compared to the space remaining in the target SSD after the chunk is moved is maximum.

The second chunk is set to be moved to the second target SSD.

Then, it is determined whether the second target SSD satisfies the bandwidth condition at S214.

At this time, whether the bandwidth condition is satisfied can be determined by comparing sum of the required bandwidths of chunks included in the second target SSD and maximum bandwidth that can be provided by the second target SSD. That is, this is the same as determining whether the second target SSD is in the overloaded state.

If the bandwidth condition is satisfied, the process proceeds to step S210 and the above-described operation is repeated.

If the bandwidth condition is not satisfied, a third chunk is selected from the second target SSD at S215.

In this embodiment, as the third chunk, a chunk having the highest required bandwidth among the chunks in the second target SSD is selected.

Thereafter, a second candidate list including SSDs capable of accommodating the bandwidth of the third chunk is set at S216.

The subsequent operation of FIG. 6 is similar to that of FIG. 4.

First, as shown in FIG. 6, it is determined whether the second candidate list is empty at S220.

If the second candidate list is empty, it means that there is no SSD having bandwidth sufficient to accommodate the bandwidth of the third chunk.

In this case, chunks are selected in the ascending order of required bandwidth in the second target SSD until removal of the selected chunks would place the second target SSD in underloaded state, and the selected chunks are set to be moved to the HDD at S221.

Thereafter, information on the overloaded list and the underloaded list is updated at S222, and the process returns to step S210 of FIG. 5.

As described above, updating the information of the overloaded list and the underloaded list is based on a state in which it is assumed that the chunks are physically relocated according to the relocation information.

If the second candidate list is not empty, a third target SSD to which the third chunk is to be moved is selected from the second candidate list based on the first indicator at S223.

Thereafter, it is determined whether there is enough space to store the third chunk in the third target SSD at S224.

If the storage space is insufficient, a chunk to be moved from the third target SSD is selected and set to be moved to the HDD at S225.

At this time, it is advantageous to select the chunk with the lowest required bandwidth among the chunks in the third target SSD as the chunk to be moved to the HDD.

Thereafter, the third chunk is set to be sent to the third target SSD at S226. If it is determined in step S224 that the storage space is sufficient, step S225 is skipped and step S226 is performed.

When step S226 is finished, step S222 is performed to update the overloaded list and underloaded list, and step S210 of FIG. 5 is performed.

When the second operation ends in this way, the chunk is physically moved according to the relocation information at S300 in FIG. 2.

As described above, the relocation information sequentially records the moving path of one or more chunks determined in the first operation and the second operation.

The data relocation control circuit 130 controls the disk array 20 to change and store the location of chunks according to the relocation information.

In this case, since the mapping relationship is changed according to the location change of the chunk, the mapping relationship between the logical address and the physical address of the chunk may be changed by controlling the data mapping circuit 120.

Figure 7:
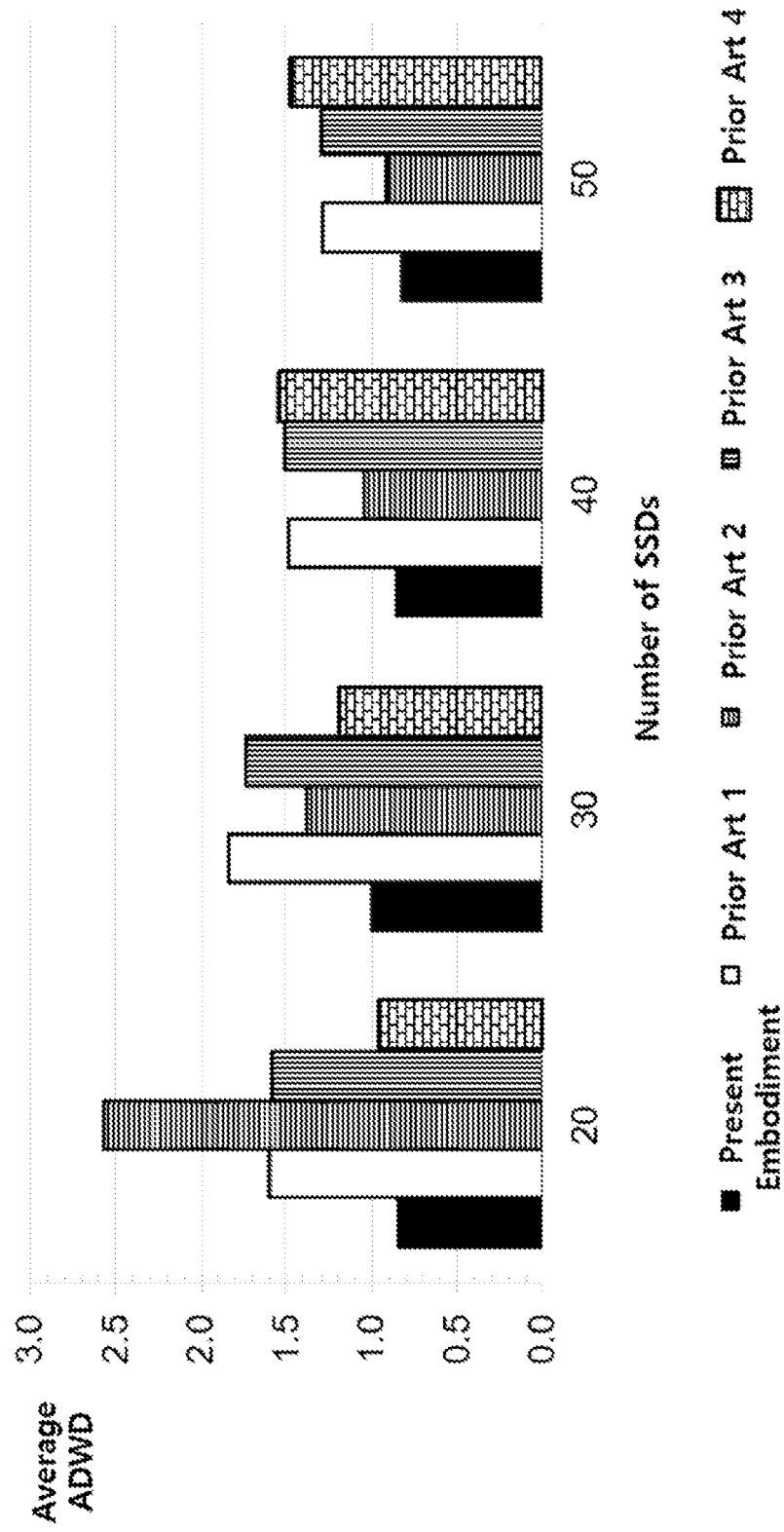
FIG. 7 is a graph showing an effect of an embodiment of the present disclosure.

FIG. 7 is a graph illustrating the effect of the present embodiment.

As shown in the graph, the average ADWD was measured to be less than 1 when the chunk rearrangement technique according to the present embodiment was applied under a set of experimental conditions. In contrast, in the prior art, the average ADWD value was measured to be greater than 1 under the same experimental conditions.

As described above, in the case of the present embodiment, the average ADWD value is maintained at less than 1, so it can be seen that the degree of decrease in lifespan is reduced compared to the prior art despite the relocation operation.

Although various embodiments have been illustrated and described, various changes and modifications may be made to the described embodiments without departing from the spirit and scope of the invention as defined by the following claims. For example, in embodiments, the circuits described herein may include one or more processors and non-transient computer-readable media, and some operations described herein may be performed by the processors executing computer programming instructions stored on the non-transient computer-readable media.

What is claimed is:

1. A data storage system comprising:
an interface circuit configured to receive a read request for a chunk;
a disk array including a plurality of main disks and a plurality of sub disks;
an input/output (I/O) control circuit configured to read the chunk among the plurality of main disks according to the read request;
a data mapping circuit configured to store mapping relations between logical addresses and physical addresses of chunks; and
a data relocation control circuit configured to control relocation of the chunks stored in the disk array,
wherein the data storage system is configured to select a source disk from among one or more main disks that are in an overloaded state, and
wherein the data relocation control circuit is configured to:
select a first target disk from among one or more main disks that are in an underloaded state;
perform a first operation for relocating a first chunk from the source disk to the first target disk; and
perform a second operation for designating a second chunk stored in a sub disk to be moved to a second target disk among the plurality of main disks which can accommodate a required bandwidth of the second chunk,
wherein a main disk being in the overloaded state corresponds to a maximum bandwidth that can be provided by the main disk being less than a sum of required bandwidths of a plurality of chunks stored in the main disk, and the main disk being in the underloaded state corresponds to the maximum bandwidth that can be provided by the main disk being greater than or equal to the sum of required bandwidths by the plurality of chunks stored in the main disk, and
wherein the data relocation control circuit is configured to:
determine whether the second target disk would be in the overloaded state as a result of the second chunk being moved to the second target disk, and
when the second target disk would be in the overloaded state:
determine one or more second candidate disks each of which can accommodate a required bandwidth of a third chunk, and
select a third target disk from among the one or more second candidate disks to move the third chunk to.

2. The data storage system of claim 1, wherein the data relocation control circuit is configured to select the first target disk from among one or more first candidate disks among the plurality of main disks, wherein each of the first candidate disks can accommodate a required bandwidth of the first chunk.

3. The data storage system of claim 2, wherein the data relocation control circuit is configured to:
when there is no first candidate disk, select a fourth chunk from the source disk and designate the fourth chunk to be moved to a sub disk.

4. The data storage system of claim 1, wherein the data relocation control circuit is configured to:
when space of the first target disk is not enough to accommodate the first chunk, select a fourth chunk of the first target disk and designate the fourth chunk to be moved to a sub disk.

5. The data storage system of claim 1, wherein the data relocation control circuit is configured to repeatedly perform the first operation while one or more of the plurality of main disk is in the overloaded state.

6. The data storage system of claim 1, wherein the data relocation control circuit is configured to monitor first information indicating which disks are in the overloaded state and second information indicating which disks are in the underloaded state, and to update the first information, the second information, or both after performing the first operation.

7. The data storage system of claim 1, wherein the data relocation control circuit is configured to designate a fourth chunk selected from the second target disk to be moved to a sub disk when there is no second candidate disk.

8. The data storage system of claim 1, wherein the data relocation control circuit is configured to designate a fourth chunk selected from the third target disk to be moved to a sub disk when space of the third target disk is not enough to accommodate the second chunk.

9. The data storage system of claim 1, wherein the data relocation control circuit is configured to perform the second operation repeatedly while a main disk that can accommodate a required bandwidth of a chunk of a sub disk exists.

10. An operation method of a data storage system storing one or more chunks in a plurality of a main disks and a plurality of sub disks, the operation method comprising:
selecting a source disk from among main disks in an overloaded state;
selecting a first target disk from among main disks in an underloaded state;

performing a first operation for setting a first chunk in the source disk to be moved to the first target disk;

selecting a second chunk from chunks stored in a sub disk;

selecting a second target disk which can accommodate a required bandwidth of the second chunk from among the plurality of main disks; and performing a second operation for setting the second chunk to be moved to the second target disk, wherein a main disk being in the overloaded state corresponds to a maximum bandwidth that can be provided by the main disk is less than a sum of required bandwidths of a plurality of chunks stored in the main disk, and the main disk being in the underloaded state corresponds to the maximum bandwidth that can be provided by the main disk being greater than or equal to the sum of the required bandwidths of the plurality of chunks stored in the main disk, and wherein performing the second operation includes:

determining whether the second target disk would be in the overloaded state as a result of the second chunk being moved to the second target disk, and when the second target disk would be in the overloaded state:

determining one or more second candidate disks each of which can accommodate a required bandwidth of a third chunk, and selecting a third target disk from among the one or more second candidate disks to move the third chunk to.

11. The operation method of claim 10, wherein performing the first operation includes selecting the first target disk from among one or more first candidate disks of the plurality of main disks each of which can accommodate a required bandwidth of the first chunk.

12. The operation method of claim 11, wherein performing the first operation includes:

when there is no first candidate disk, selecting a fourth chunk from the source disk and setting the fourth chunk to be moved to a sub disk.

13. The operation method of claim 10, wherein performing the first operation includes:

when space of the first target disk is not enough to accommodate the first chunk, selecting a fourth chunk of the first target disk and setting the fourth chunk to be moved to a sub disk.

14. The operation method of claim 10, further comprising repeatedly performing the first operation while one or more of the plurality of main disks is in the overloaded state.

15. The operation method of claim 10, wherein performing the first operation includes updating first information indicating which disks are in the overloaded state and second information indicating which disks are in the underloaded state.

16. The operation method of claim 10, wherein performing the second operation includes setting a fourth chunk selected from the second target disk to be moved to a sub disk when there is no second candidate disk.

17. The operation method of claim 10, wherein performing the second operation includes setting a fourth chunk selected from the third target disk to be moved to a sub disk when space of the third target disk is not enough to accommodate the second chunk.

18. The operation method of claim 10, further comprising performing the second operation repeatedly while a main disk that can accommodate a required bandwidth of a chunk of a sub disk exists.

* * * * *